(12) United States Patent
Albrecht et al.

(10) Patent No.: US 7,075,053 B2
(45) Date of Patent: Jul. 11, 2006

(54) DEVICE FOR DETERMINING THE POSITION OF A SCRAPER

(75) Inventors: Markus Albrecht, Abstatt (DE); Aydin Ucan, Ludwigsburg (DE)

(73) Assignee: Eisenmann Lacktechnik KG, Boblingen (DE)

( * ) Notice: Subject to any disclaimer, the term of this patent is extended or adjusted under 35 U.S.C. 154(b) by 401 days.

(21) Appl. No.: 10/434,406

(22) Filed: May 8, 2003

(65) Prior Publication Data

US 2004/0069961 A1 Apr. 15, 2004

(30) Foreign Application Priority Data

May 10, 2002 (DE) ................. 102 20 676

(51) Int. Cl.
  *G01D 5/00* (2006.01)
(52) U.S. Cl. ............................ 250/221; 134/2; 116/173
(58) Field of Classification Search ............. 250/559.4, 250/221, 222.1; 356/622; 73/865.9, 866.1; 15/104.61; 116/173, 303; 118/246, 261, 118/262, DIG. 17; 134/2; 220/224
See application file for complete search history.

(56) References Cited

U.S. PATENT DOCUMENTS

| 3,597,680 | A | * | 8/1971 | Haddon | 324/326 |
| 3,754,275 | A | * | 8/1973 | Carter et al. | 346/33 P |
| 4,491,018 | A | * | 1/1985 | Stringer et al. | 73/865.8 |
| 4,714,888 | A | * | 12/1987 | French et al. | 324/326 |
| 5,240,350 | A | * | 8/1993 | Yamaguchi et al. | 405/143 |
| 5,469,155 | A | * | 11/1995 | Archambeault et al. | 340/853.4 |
| 5,506,505 | A | * | 4/1996 | Worthen et al. | 324/326 |
| 5,651,638 | A | * | 7/1997 | Heggerud | 405/184.1 |

FOREIGN PATENT DOCUMENTS

WO  WO 00/65271 A1  2/2000

* cited by examiner

*Primary Examiner*—Stephone B. Allen
(74) *Attorney, Agent, or Firm*—Watson IP Group, PLC; Jovan N. Jovanovic; Vladan M. Vasiljevic

(57) ABSTRACT

A device for determining the position of a scraper which is displaceable for the transport of coating material in a supply path of thereof, the coating material comprises a sensor responding to the presence of the scraper. This sensor is accommodated in a separate measuring head, which contains an inner, self-sufficient current source and a circuit arrangement which generates an electric output signal indicating presence or absence of the scraper on the sensor. The information in this output signal is conducted by means of a device, which manages without galvanic connection, preferably via an optical waveguide, to an evaluation circuit, electrically insulated at a distance from the measuring head and which generates an electric output signal used for controlling other parts of the plant. A device of this kind can also be used for detecting scrapers where, as frequently in electrostatically operating coating plants, the sensor has to be attached at a point located at high electric potential.

4 Claims, 1 Drawing Sheet

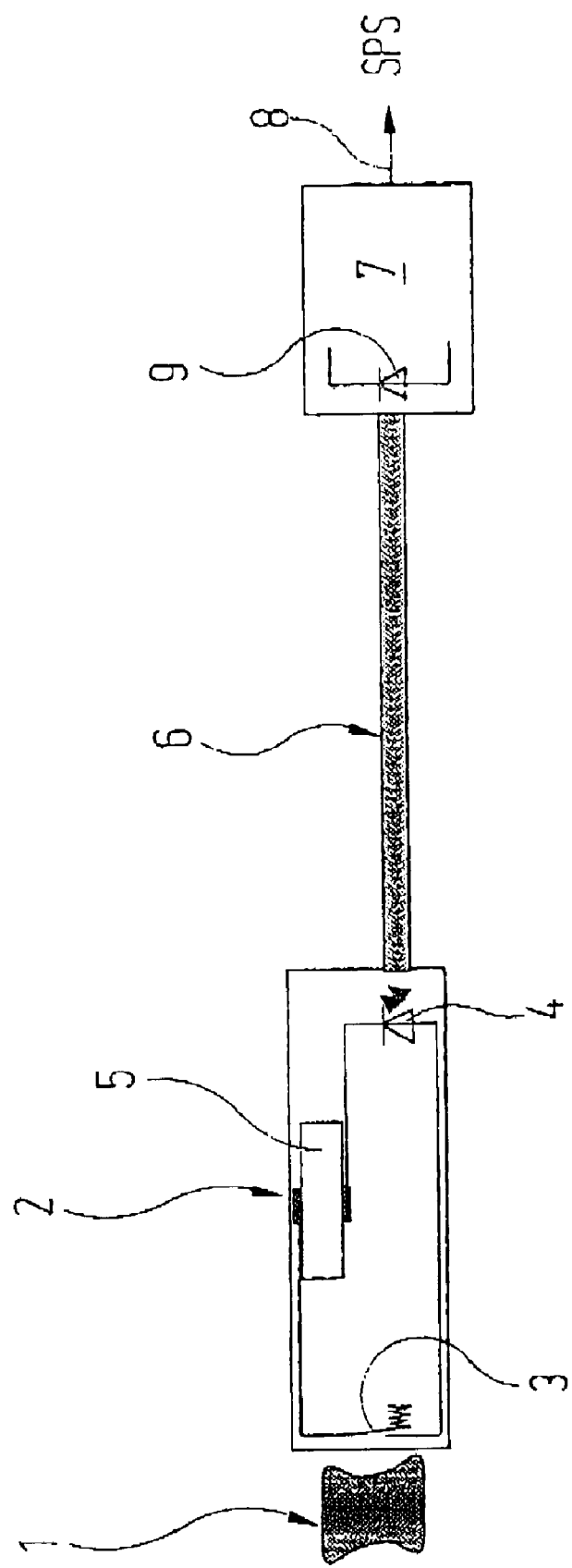

DEVICE FOR DETERMINING THE POSITION OF A SCRAPER

BACKGROUND OF THE INVENTION

1. Field of the Invention

The invention relates to a device for determining the position of a scraper, which is displaceable for transport of coating material, in particular a liquid or powder lacquer, in a supply path of the coating material, with (a) a sensor responding to the presence of the scraper, and (b) a circuit arrangement to which the output signal of the sensor is supplied and which generates an electric output signal which is representative of the presence or absence of the scraper on the sensor.

2. Background Art

In coating techniques it is widespread to convey the coating material with the aid of a scraper through a hose, e.g. from a supply source to a different location, in particular to application devices. The movement of the scraper, in particular its arrival at the various scraper stations, is monitored with the aid of devices of the kind initially mentioned. Their output signal can then be used for controlling valves, for switching voltages, or suchlike. As sensors, both those which operate inductively or optically and those which respond to the magnetic field of a magnetic material entrained by the scraper can be considered.

In the known devices for determining the position of a scraper currently found on the market, in general the sensor is connected to the control circuit via an electric line. This is possible all the time the sensor is not located at high electric potential. The latter is the case, for example, in scraper stations assigned to application devices operating with internal charging, e.g. high rotation atomising.

SUMMARY OF THE INVENTION

The object of the present invention is to configure a device of the kind initially mentioned in such a way that it can even be used where the point at which the presence of the scraper is to be monitored is at a very high potential compared with earth potential, without there being any danger of an electric flashover.

This object is achieved according to the invention in that (c) the sensor is accommodated in a separate measuring head, which contains an inner, self-sufficient current source, in particular a battery, and a circuit arrangement which generates an electric output signal standing for the presence or absence of the scraper on the sensor, (d) an evaluation circuit is provided which is arranged Electrically insulated at a distance from the measuring head and on its part generates an electric output signal which can be used for controlling other parts of the plant, (e) a device is provided which supplies the information contained in the output signal of the measuring head without galvanic connection of the evaluation circuit.

According to the invention the sensor which responds to the presence of a scraper in its vicinity is therefore integrated into a separate measuring head, which can be placed jointly with the sensor at high electric potential. So that a separate electric signal can be generated in this measuring head, it contains a self-sufficient current source. The output signal of this measuring head is supplied to the evaluation circuit via a connection which dispenses with galvanic elements. This again generates an electric signal which can be used for control purposes. There is thus a complete galvanic division between the measuring head located at high potential and the evaluation circuit located at lower potential, for example, earth potential. If there is sufficient distance between the measuring head and the evaluation circuit the danger of an electric flashover can be completely eliminated.

It is particularly preferred if the device mentioned in feature e) of claim 1 comprises a luminous diode in the measuring head, an optical waveguide illuminated at one end by the luminous diode and a receiving diode illuminated by the other end of the optical waveguide and arranged in the evaluation circuit. The electro-optic components required for light coupling between measuring head and evaluation circuit of this kind are commercially available and reasonably priced.

Alternatively, the embodiment of the invention in which the device mentioned in feature e) of claim 1 comprises a radio transmitter in the measuring head and a radio receiver in the evaluation circuit can also be used. This configuration of the invention is more complicated, but more flexible in the choice of arrangement of measuring head and evaluation circuit in respect of one another.

BRIEF DESCRIPTION OF THE DRAWINGS

An embodiment example of the invention is explained in greater detail below using the drawing, wherein:

FIG. 1 shows schematically a device for detecting a scraper at a scraper station located at high voltage.

DETAILED DESCRIPTION OF THE DRAWINGS

While this invention is susceptible of embodiment in many different forms, there is shown in the drawings and described herein in detail a specific embodiment with the understanding that the present disclosure is to be considered as an exemplification of the principles of the invention and is not intended to limit the invention to the embodiment illustrated.

In the drawing a scraper is illustrated with the reference numeral 1, as known per se for conveying lacquer, in particular lacquer powder, in an appropriate hose from the lacquer supply to an application device. The hose itself, in which the scraper 1 moves, is not illustrated in the drawing. In order to be able to establish the position of the scraper 1 within the lacquer conveyance path at least one magnet is integrated therein.

The scraper 1 is located in a scraper station, which is assigned to an application device operating with a high voltage electrode and also, for reasons of clarity, not shown. This means that the entire scraper station is located at high potential, which typically can be at approximately 60 kV or above. The arrival of the scraper 1 in this scraper station assigned to the application device is determined with the aid of a measuring head 2, into which a magnetic field sensitive switch 3 is integrated. The switch 3 is electrically located in series with a luminous diode 4; this series connection is fed from a battery 5.

Into the end of the measuring head 2 opposite the magnetic field sensitive switch 3 an optical waveguide 6 is inserted, whose end there can be irradiated by the luminous diode 4. The optical waveguide 6 connects the measuring head 2 to an evaluation circuit 7, in which there is, i.a., a receiving diode 9, which converts back the light signals communicated to it into electric signals. Via an output 8 of the evaluation circuit 7 corresponding signals are issued to the central control SPS of the lacquering plant to which the hose guiding the scraper 1 belongs.

The above-described device functions as follows.

All the time the scraper 1 is not in the scraper station assigned to the measuring head 2 the magnetic field sensitive switch 3 is open. Thus no current flows through the luminous diode 4, so it does not release any light into the optical waveguide 6 either. At the output 8 of the evaluation circuit 7 is a corresponding signal which signals to the central control of the plant the absence of the scraper 1.

If, on the other hand, the scraper 1 has reached the scraper station, in other words is in the position illustrated in the drawing, the magnetic field sensitive switch 3 closes. Now a current flows through the luminous diode 4, the light signals of which are supplied to the evaluation circuit 7 via the optical waveguide 6. The receiving diode 9 there converts these light signals into an electric signal. The evaluation circuit 7 now issues a signal on the output 8, which stands for the presence of the scraper 1 in the scraper station. The central control SPS of the lacquering plant can react correspondingly to this, for example by changing valves or suchlike.

The wavelength at which the luminous diode 4 operates is basically unimportant. In many cases, on cost grounds alone, an infrared LED is worth considering.

The optical waveguide 6 forms a division of potential between the measuring head 2 located at high voltage and the evaluation circuit 7. Instead of an optical waveguide 6 of this kind a radio connection in a corresponding frequency range, permissible for this, can be used between the measuring head 2 and the evaluation circuit 7.

The foregoing description merely explains and illustrates the invention and the invention is not limited thereto except insofar as the appended claims are so limited, as those skilled in the art who have the disclosure before them will be able to make modifications without departing from the scope of the invention.

What is claimed is:

1. A device for determining the position of a scraper which is displaceable for the transport of a coating material in a supply path of a coating material which supply path is designed to be put to high voltage, comprising:
    a) a sensor responding to the presence of the scraper, the sensor being accommodated in a separate measuring head which includes an inner, self-sufficient current source and a circuit arrangement which generates an electric output signal representative of the presence or absence of the scraper on the sensor,
    b) an evaluation circuit electrically insulated at a distance from the measuring head which is capable of generating an electric output signal which can be used for controlling other parts of a plant, and
    c) a device which supplies the information in the electric output signal of the measuring head which is free of a galvanic connection of the evaluation circuit.

2. The device according to claim 1, wherein the device described in feature c) comprises a luminous diode in the measuring head, an optical waveguide illuminated at one end by the luminous diode and a receiving diode illuminated by the other end of the optical waveguide and arranged in the evaluation circuit.

3. The device according to claim 1, wherein the device described in feature c) comprises a radio transmitter in the measuring head and a radio receiver in the evaluation circuit.

4. The device according to claim 1, wherein the self sufficient electrical source comprises a battery.

\* \* \* \* \*